United States Patent [19]

Baumann et al.

[11] Patent Number: 4,544,738
[45] Date of Patent: Oct. 1, 1985

[54] REACTIVE PYRAZOLE GROUP CONTAINING MONOAZO DYE

[75] Inventors: Hans Baumann; Hermann Kaack, both of Wachenheim, Fed. Rep. of Germany

[73] Assignee: BASF Aktiengesellschaft, Ludwigshafen, Fed. Rep. of Germany

[21] Appl. No.: 190,179

[22] Filed: Sep. 24, 1980

Related U.S. Application Data

[63] Continuation of Ser. No. 29,043, Apr. 11, 1979, abandoned.

[30] Foreign Application Priority Data

Apr. 19, 1978 [DE] Fed. Rep. of Germany ....... 2817033

[51] Int. Cl.[4] .................. C09B 62/008; C09B 62/085; C09B 62/245; C09B 62/665
[52] U.S. Cl. ...................................... 534/617; 534/630; 534/633; 534/632; 534/636; 534/643
[58] Field of Search ................... 260/153, 146 T, 147, 260/162; 534/617, 630, 633, 636, 643, 632

[56] References Cited

U.S. PATENT DOCUMENTS

| | | | |
|---|---|---|---|
| 2,795,576 | 6/1957 | Fasciati | 260/153 |
| 2,875,192 | 2/1959 | Gunst | 260/153 |
| 2,945,021 | 7/1960 | Faciati et al. | 260/153 |
| 3,208,992 | 9/1965 | Bowman et al. | 260/162 |
| 3,342,798 | 9/1967 | Dussy et al. | 260/146 D |
| 3,426,008 | 2/1969 | Meininger et al. | 260/151 |
| 3,433,781 | 3/1969 | Ackermann et al. | 260/154 X |
| 3,435,023 | 3/1969 | Meininger et al. | 260/163 |
| 3,637,648 | 1/1972 | Kuhne et al. | 260/162 |
| 3,755,290 | 8/1973 | DeMontmollin et al. | 260/162 X |
| 3,993,440 | 11/1976 | Ridyard | 260/153 X |
| 4,145,340 | 3/1979 | Ridyard | 260/153 |

FOREIGN PATENT DOCUMENTS

| | | | |
|---|---|---|---|
| 948160 | 1/1964 | United Kingdom | 260/153 |
| 1093354 | 11/1967 | United Kingdom | 260/153 |

*Primary Examiner*—Floyd D. Higel
*Attorney, Agent, or Firm*—Oblon, Fisher, Spivak, McClelland & Maier

[57] ABSTRACT

A dye of the formula

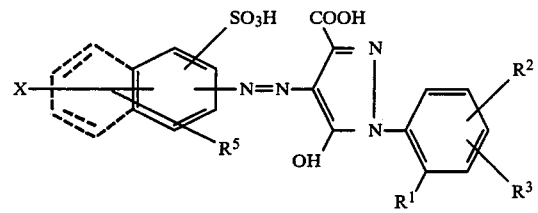

wherein $R^1$ is is fluorine, chlorine, bromine, methyl, ethyl, cyano, carboxyl, nitro, tribfluoromethyl, methylsulfonyl, phenylsulfonyl, acetyl, $C_1$-$C_4$ alkoxy, phenoxy, chlorophenoxy or benzoyl; $R^2$ is hydrogen, chlorine, bromine, methyl, ethyl, $C_1$-$C_4$ alkoxy, benzthiazol-2-yl, 6-methylbenzthiazol-2-yl, acetylamino, carboxyl aminosulfonyl, or aminocarbonyl; $R^3$ is hydrogen chlorine, bromine or methyl; $R^5$ is hydrogen, methyl, methoxy or ethoxy; and X is fluorohydroxyphosphonyl or dihydroxyphosphonyl. The dye of the present invention is useful in the dyeing of cellulose-containing material, polyamides and leather. The high tinctorial strength of the dyes and the very good lightfastness and wetfastness properties of the dyeings are particularly noteworthy.

4 Claims, No Drawings

REACTIVE PYRAZOLE GROUP CONTAINING MONOAZO DYE

This is a continuation of application Ser. No. 029,043, filed Apr. 11, 1979 now abandoned.

The present invention provides novel compounds which are useful in acid or salt form as reactive dyes and which in the form of the free acids have the general formula I

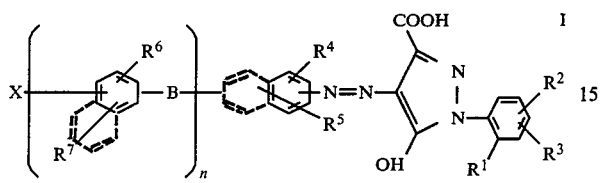

where the dashed lines represent optionally present fused benzene rings,

B is a radical of the formula —N=N—, —CONH—, —SO$_2$NH—, —NHCO—, —NHCO$_2$—, —NHCONH— or —CH=CH— or is a direct bond, n is 0 or 1, $R^1$ is fluorine, chlorine, bromine, methyl, ethyl, cyano, carboxyl, nitro, trifluoromethyl, acetyl, methylsulfonyl, $C_1$ to $C_4$ alkoxy, phenoxy, chlorophenoxy, benzoyl or phenylsulfonyl, $R^2$ is hydrogen, chlorine, bromine, methyl, ethyl, $C_1$ to $C_4$ alkoxy, benzthiazol-2-yl, 6-methylbenzthiazol-2-yl, acetylamino, carboxyl, aminocarbonyl or aminosulfonyl, $R^3$ is hydrogen, chlorine, bromine or methyl, $R^4$ is hydrogen, chlorine, methyl, methoxy, ethoxy, carboxyl, acetylamino or hydroxysulfonyl, $R^5$ is hydrogen, methyl, methoxy, ethoxy or hydroxysulfonyl, $R^6$ is hydrogen, methyl, ethyl, methoxy or ethoxy, $R^7$ is hydrogen, methyl, ethyl, chorine, methoxy, ethoxy, acetylamino, ureido, hydroxysulfonyl or dihydroxyphosphonyl (cPO$_3$H$_2$) and X is a reactive radical bonded directly or via an oxygen, methylene, imino, methylimino, iminomethylene or methyliminomethylene bridge.

Reactive radicals for the purpose of the invention are all groups which, in reactive dyes, are capable under dyeing or printing condition of forming a covalent bond with a substrate being dyed or printed with the dye. Many groups of this type have already been disclosed in the literature; such groups may be derived from triazines, pyrimidines, pyridazines, quinoxalines, quinazolines, phthalazines, tiazoles, benzthiazoles, vinylsulfones or intermediates of these, acrylic compounds, halopropionyl compounds, haloacetyl compounds, fluorocyclobutyl compounds and acids derived from phosphorus. In addition to the monohalotriazinylamino radicals identified more closely below, the following reactive groups X may be mentioned as specific examples:

Radicals bonded via an imino, methylimino, iminomethylene or methyliminomethylene bridge:

2,4-Dichlorotriazin-6-yl, 2,4-dibromotriazin-6-yl, 2-chloro-4-methyltriazin-6-yl, 2-chloro-4-phenyl-triazin-6yl, 2-trimethylammonium-4-phenylamino-triazin-6-yl, 2-(1,1-dimethylhydrazinium )-4-m-sulfophenyltriazin-6-yl, 2,4-dichloropyrimidin-6-yl, 2,4,5-trichloropyrimidin-6-yl, 2,4-dichloro-5-nitro-, -5-methyl-, -5-bromo-, -5-acetyl-methyl-, -5-carboxy-, -5-cyano-, -5-vinyl-, -5-sulfo-, -5-chloromethyl-, -5-dichloromethyl-, -5-trichloromethyl- , -5-trifluoromethyl- and -5-carbomethoxy-pyrimidin-6-yl, 2,4-dichloropyrimidine-5-carbonyl and -5-sulfonyl, 2,6-dichloropyrimidine-4-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 2,4-dichloro-6-methyl-pyrimidine-5-carbonyl, 2,4,5-trichloropyrimindine-5-carbonyl, 2-fluoro-pyrimidin-4-yl, 2,6-difluoro-pyrimidin-4-yl, 2,6-difluoro-5-chloro-pyrimidin-4-yl, 2-fluoro-5,6-dichloropyrimidin-4-yl, 2,6-dilfuoro-5-methyl-pyrimidin-4-yl, 2,5-difluoro-6-methyl-pyrimidin-4-yl, 2-fluoro-5-methyl-6-chloropyrimidin-4-yl, 2-fluoro-5-nitro-6-chloropyrimidin-4-yl, 2-fluoro-5-bromo-, -5-cyano-, -5-methyl-, -5chloro-, -5-nitro-, -5-phenyl-, -5-methylsulfonyl, -5-carboxamido-, -5-carbomethoxy-, -5-sulfonamido- and -5-trifluoromethyl-pyrimidin-4-yl, 2-fluoro-6-methyl-, -6-chloro-, -6-cyano-, -6-carboxamido-, -6-carboalkoxy- and -6-phenyl-pyrimidin-4-yl, 2,5,6-trifluoro-pyrimidin-4-yl, 2-fluoro-5-chloro-6-chloromethyl-pyrimidin-5-yl, 2-fluoro-5-bromo-6-methyl- and -6-chloromethyl-pyrimidin-4-yl, 2,6-difluoro-5-bromo, -5-nitro- and -5-chloromethylpyrimidin-4-yl, 2-fluoro-5m-chloro-6-methylpyrimidin-4-yl, 2-fluoro-5-chloro- and -5-bromo-6-trifluoromethyl-pyrimidin-4-yl, 2-fluoro-6-trifluoromethyl-pyridinyl, 5-methylsulfonlyl-pyrimidin-4-yl, 2,6-difluoro-5-methylsulfonyl-pyrimidin-4-yl, 2-fluoro-5-chloro-6-carbomethoxy-pyrimidin-4-yl, 2,6-difluoro-5-trifluoromethyl-pyrimidin-4-yl, 2,4-bis-(hydroxysulfonyl)-triazin-6-yl, 2,4-bis-(phenylsulfonyl)-triazin-6-yl, 2-(3'-carboxy- and -sulfo-phenyl)-sulfonyl-4-chloro- and -4-fluoro-triazin-6-yl, 2,4-bis-(3-carboxyphenyl)-sulfonyl-4-chloro- and -4-fluoro-triazin-6-yl, 2-methylsulfonyl-6-methyl- and -6-ethyl-pyrimidin-4-yl, 2-phenylsulfonyl-5-chloro-6-methylpyrimidin-4-yl, 2,6-bis-methylsulfonyl-pyrimidin-4-yl, 2,6-bis-methylsulfonyl-pyrimidine-5-sulfonyl, 2-methylsulfonyl-pyrimidin-4-yl, 2-phenylsulfonyl-pyrimidin-4-yl, 2-trichloromethylsulfonyl-6-methyl-pyrimidin-4-yl, 2-methylsulfonyl-5-chloro- and -5-bromo-6-methyl-pyrimidin-4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methylpyrimidine-5-sulfonyl, 2-methylsulfonyl-5-nitro-6-methylpyrimidin-4-yl, 2,5,6-trimethylsulfonyl-pyrimidin-4-yl, 2-methylsulfonyl-5,6-dimethylpyrimidin-4-yl, 2-ethylsulfonyl-5-chloro-6-methylpyrimidin-4-yl, 2-methylsulfonyl-6-chloro-, -6-carboxy- and -6-carboalkoxy-pyrimidin-4-yl, 2,5-bis-methylsulfonyl-5-chloro-pyrimidin-4-yl, 2-methylsulfonyl-5-sulfo-, -5-carboxy-, -5-cyano-, -5chloro- and -5-bromo-pyrimidin-4-yl, 2-sulfoethyl-sulfonyl-6-methylpyrimidin-4-yl, 2-phenylsulfonyl-5chloropyrimidin-4yl, 2-carboxymethylsulfonyl-5-chloro-6-methylpyrimidin-4-yl, 2-methylsulfonyl-6-chloro-pyrimidine-4- and -5-carbonyl, 2,6-bis-(methylsulfonyl)-pyrimidine-4- and -5-carbonyl, 2-ethylsulfonyl-6-chloro-pyrimidine-5-carbonyl, 2,4-bis-(methylsulfonyl)-pyrimidine-5-sulfonyl, 2-methylsulfonyl-4-chloro-6-methylpyrimidine-5-carbonyl and -5-sulfonyl, 3,6-dichloropyridazin-4-yl, 3,6-dichloropyridazine-4-carbonyl, 3,5,6-trichloro- and 3,5,6-trifluoropyridazin-4-yl, β-(4,5-dichloro-pyridaz-5-on-1-yl)-propionyl, 2-chloro-4-methyl-thiazole-5-carbonyl, 2-chlorobenzthazole-6-carbonyl and -6-sulfonyl, 2-fluorobenzthiazole-6-carbonyl and -6-sulfonyl, 2-chloroquinoxaline-3-carbonyl, 2- and 3-chloro- and -fluoro-quinoxaline-6-carbonyl, 2- and 3-chloro- and -fluoro-quinoxaline-6-sulfonyl, 2,3-dichloroquinoxaline-6-carbonyl and -6-sulfonyl, 1,4-dichlorophthalazine-6-carbonyl and -6-sulfonyl, 1,4-difluorophthalazine-6-carbonyl and -6-sulfonyl, 2,2′,3,3′-tetrafluorocyclobutyl-carbonyl, β-(2,2′,3,3′-tetrafluorocyclobutyl)-acrylyl, chloroacetyl, β-chloropropionyl, β-bromopropionyl, α,β-dibromopropionyl, mono-, di- and trichloroacrylyl, α-bromoacrylyl, 3-methylsulfonyl-propionyl, 3-phenylsulfonylpropionyl, β-dichloroethylsulfonyl and β-chlorovinylsulfonyl.

Further examples of reactive groups X are the following radicals bonded directly, via an oxygen bridge or via a methylene bride to the aromatic nucleus: vinylsulfonyl, β-chloroethylsulfonyl, O-hydroxysulfonyl-β-oxyethylsulfonyl, S-hydroxysulfonyl-β-thioethylsulfonyl, O-dihydroxyphosphinyl-β-oxyethylsulfonyl, β-dimethylaminoethylsulfonyl, O-hydroxysulfonyl-β-oxyethylaminosulfonyl, β-chloroethylaminosulfonyl, ethylsulfonyl, hydroxymethylaminocarbonyl, fluorohydroxyphosphonyl and dihydroxyphosphonyl.

A compound of the formula I can advantageously be prepared by coupling a diazonium compound of an amine of the general formula II

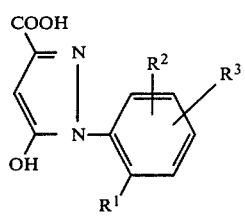

with a compound of the general formula III

R¹ to R⁷, B, X and n having the meanings stated above.

It is also possible to condense the reactive radical with the azo dye from which the compound is to be derived or to make further variations in the process of preparation. Some variations are disclosed, in principle, in the literature.

Further details of the preparation of the dyes may be found in the Examples which follow, where parts and percentages are by weight unless stated otherwise.

The compounds of the general formula I may be used for dyeing and printing cellulose-containing material, such as cotton, staple rayon, linen or viscose, polyamides, such as wool, silk and nylon, and leather. Conventional dyeing and printing methods may be used.

The dyes are distinguished by high tinctorial strength and give dyeings having good fastness characteristics, amongst which the lightfastness and wetfastness deserve particular mention.

Particularly important dyes are those of the general formula Ia

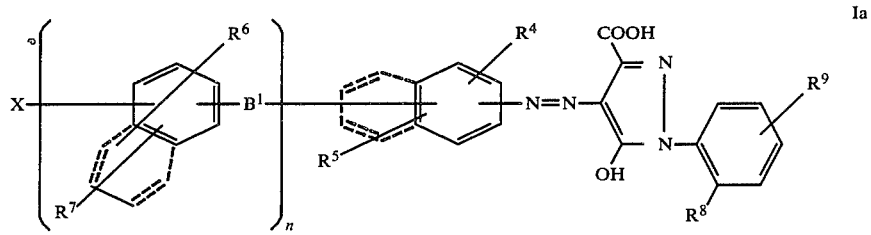

where
B¹ is —N=N—, —CONH—, —CH=CH— or a direct bond,
R⁸ is fluorine, chlorine, bromine, methyl, ethyl, trifluoromethyl, methoxy or ethoxy,
R⁹ is hydrogen, chlorine, methyl, ethyl, methoxy or ethoxy and
n, R⁴, R⁵, R⁶, R⁷ and X have the meanings given above.

Preferred dyes for example have the general formula Ib

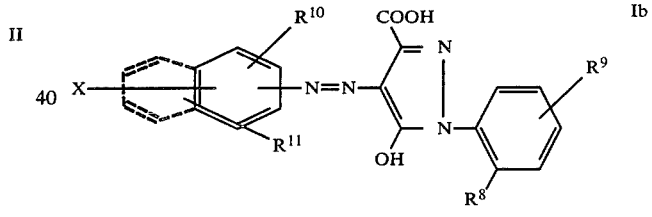

where
R¹⁰ is hydrogen, methyl, methoxy, carboxyl or hydroxysulfonyl,
R¹¹ is hydrogen, methyl or hydroxysulfonyl and
R⁸, R⁹ and X have the meanings given above.

For economic reasons, it is preferred that R⁸ is chlorine, methyl, ethyl or methoxy and R⁹ is hydrogen, chlorine or methyl.

Examples of preferred radicals X, in addition to the monohalo-s-triazinyl radicals mentioned in the Examples below, are the following radicals bonded via an imino, methylimino, iminomethylene bridge: 2,4-dichloro-triazin-6-yl, 2,4-dichloropyrimidin-6-yl, 2-methylsulfonyl-6-methyl-5-chloropyrimidin-4-yl, 2,5,6-trichloro-pyrimidin-4-yl, 2,5,6-trifluoropyrimidin-4-yl, 2,6-difluoro-5-chloropyrimidin-4-yl, 2,4-dichloropyrimidine-5-carbonyl and -sulfonyl, 2,6-dichloro-5-cyano-pyrimidin-4-yl, 3,4,6-trichloro- and -trifluoro-pyridazin-5-yl, 2,3-dichloroquinoxaline-6-carbonyl and -6-sulfonyl, 2-chlorobenzthiazole-6-carbonyl and -6-sulfonyl, chloroacetyl, β-chloropropionyl, α,β-dichloropropionyl, α,β-dibromopropionyl, acrylyl and α-bromoacrylyl.

The following reactive radicals bonded directly or via an oxygen or methylene bridge to the phenyl nucleus are also preferred: vinylsulfonyl, β-chloroethylsulfonyl, O-hydroxysulfonyl-β-oxyethylsulfonyl, β-diethylaminosulfonyl, O-hydroxysulfonyl-β-oxethylaminosulfonyl, fluorohydroxyphosphonyl and dihydroxyphosphonyl.

EXAMPLE 1

28.6 parts of acetic anhydride are added to a neutralized aqueous solution of 56 parts of benzidine-3-sulfonic acid; the mixture is stirred at room temperature, the pH being maintained at 5 by adding sodium bicarbonate. When the acetylation is complete, ice is added and diazotization is carried out in the conventional way with 13.9 parts of sodium nitrite and 120 parts of hydrochloric acid (d=1.09). Excess nitrous acid is then destroyed with 1 part of amidosulfonic acid, after which a neutralized solution of 54.6 parts of 1-(2,5-dichlorophenyl)-3-carboxy-5-pyrazolone in 900 parts of water is added and the coupling is completed by adding dilute sodium hydroxide solution. Thereafter, sufficient sodium hydroxide is added to produce a 4% strength solution, and the latter is heated at 80° C., with stirring, until the acetyl group has been split off. After the mixture was cooled, the aminoazo dye is transiently isolated by adding hydrochloric acid to bring the pH to 3 and filtering. The filter residue is then dissolved in 3,000 parts of water to which dilute sodium hydroxide solution is added, the resulting solution is cooled to 5° C. and 37 parts of cyanuric chloride in 350 parts of acetone are added. The acylation is completed in a weakly acid medium by adding 30 parts of trisodium phosphate, and the dye is then precipitated at pH 7 by adding sodium chloride. The material obtained from the filter press is dried under reduced pressure at 40° C. 86 parts of a brown powder, which dyes cellulose in fast orange hues, are obtained.

If 1-(2,5-dichlorophenyl)-3-carboxy-5-pyrazolone is replaced by, for example, 1-(2-methylphenyl)-, 1-(2-chlorophenyl)-, 1-(2-methoxyphenyl)- or 1-(2-chloro-4-methylphenyl)-3-carboxy-5-pyrazolone, dyes with similar properties are obtained.

EXAMPLE 2

The product obtained by condensing 18.8 parts of 1,3-phenylenediamine-4-sulfonic acid with 18.5 parts of cyanuric chloride is stirred, in 950 parts of ice water, with 7 parts of sodium nitrite and 60 parts of hydrochloric acid (d=1.09) for 2 hours at 0°–5° C. Excess nitrous acid is then destroyed with 1 part of amidosulfonic acid and a neutral solution of 27.3 parts of 1-(2,4-dichlorophenyl)-3-carboxy-5-pyrazolone in 350 parts of water is slowly added to the diazo suspension. The pH is regulated to 7, initially by adding 14.2 parts of disodium hydrogen phosphate and then by adding dilute sodium hydroxide solution, and after completion of coupling the precipitated dye is filtered off directly. The material from the filter press is dried under reduced pressure at 40° C. 74 parts of a yellow powder are obtained; this dyes cellulose, for example by the low temperature exhaustion method, and by the cold batch method, in deep, fast greenish yellow hues.

If the 1-(2,4-dichlorophenyl)-3-carboxy-5-pyrazolone is replaced by, for example, 1-(2-chlorophenyl)-, 1-(2-fluorophenyl)-, 1-(2-methylphenyl)-, 1-(2-ethylphenyl)-, 1-(2-methoxyphenyl)-, 1-(2-ethoxyphenyl)-, 1-(2,5-dichlorophenyl)-, 1-(2-chloro-6-methylphenyl)-, 1-(2,4,5-trichlorophenyl)-, 1-(2-chloro-4-methylphenyl)-, 1-(2-methyl-4-chlorophenyl)-, 1-(2,5-dimethylphenyl)-, 1-(2,6-dichlorophenyl)-, 1-(2,4-dichloro-6-carboxyphenyl)-, 1-(2-trifluoromethylphenyl)-, 1-(2,4-dichloro-6-methoxyphenyl)-, 1-(3,4-dichloro-6-methylphenyl)-, 1-(2-ethylphenyl)-, or 1-(2-phenoxyphenyl)-3-carboxy-5-pyrazolone, dyes with similar properties are obtained. These dyes also dye leather, wool and nylon in greenish yellow hues.

EXAMPLE 3

18.5 parts of cyanuric chloride suspended in ice water are added to a solution, neutralized with sodium hydroxide, of 38.6 parts of 4-(4'-aminobenzoylamino)-1-aminobenzene-2,5-disulfonic acid which has been prepared by condensing molar amounts of 4-nitrobenzoyl chloride and 1,4-phenylenediamine-2,5-disulfonic acid and then reducing the nitro group. The mixture is stirred for some time at 0°–5° C. and the pH is kept slightly acid with trisodium phosphate until the reaction has ended. The mixture is then diazotized with 6.9 parts of sodium nitrite and 90 parts of hydrochloric acid (d=1.09) in the course of 2 hours. A neutralized aqueous solution of 23.9 parts of 1-(2-chlorophenyl)-3-carboxy-5-pyrazolone is added and the pH is kept neutral with dilute sodium hydroxide solution. After completion of coupling, the dye is precipitated with potassium chloride, filtered off and dried under reduced pressure at a slightly elevated temperature. The dye, when used by various cold dyeing methods, gives pure reddish yellow hues on cotton.

If, instead of 1-(2-chlorophenyl)-3-carboxy-5-pyrazolone, 1-(2-methylphenyl)-, 1-(2-cyanophenyl)-, 1-(2-methoxyphenyl)-, 1-(2-chloro-6-methylphenyl)-, 1-(2,6-dichlorophenyl)- or 1-(2-chloro-4-methylphenyl)-3-carboxy-5-pyrazolone is employed as the coupling component, dyes having similar properties are obtained.

EXAMPLE 4

45.2 parts of the dye prepared by coupling diazotized 4-nitroaniline-2-sulfonic acid with 1-(2-chloro-4-methylphenyl)-3-carboxy-4-pyrazolone and then reducing the nitro group are introduced into 900 parts of ice water and a suspension of 18.4 parts of cyanuric chloride in 250 parts of ice water is added. The mixture is stirred for 1–2 hours at 0°–2° C. and a pH of 4–5 which is maintained by adding disodium tetraborate. After completion of coupling, the solution is clarified by filtration and the dye is salted out with potassium chloride at a neutral pH and is dried under reduced pressure at 40° C. An orange powder is obtained, which dyes natural or regenerated cellulose structures in clear, golden yellow hues having good fastness characteristics.

The dye can also be isolated by spray-drying the solution obtained from the synthesis.

Dyes having similar properties are obtained, for example, by using 1-(2-chlorophenyl)-, 1-(2-methylphenyl)-, 1-(2-methoxyphenyl)-, 1-(2,5-dichlorophenyl)-, 1-(2,5-dimethylphenyl)- or 1-(2-chloro-6-methylphenyl)-3-carboxy-5-pyrazolone as the coupling component.

EXAMPLE 5

68.2 parts of the trisodium salt of the aminoazo compound obtained by coupling molar amounts of diazotized 4-nitro-4'-aminostilbene-2,2'-disulfonic acid with 1-(2-methoxy-phenyl)-3-carboxy-5-pyrazolone and then reducing the nitro group are dissolved in 1,200 parts of cold water. This solution is run slowly into a suspension obtained by pouring a solution of 18.6 parts of cyanuric chloride in 380 parts of acetone into a mixture of 100 parts of water and 200 parts of ice. The mixture is stirred for some time at 0°–5° C. whilst keeping the pH slightly acid by adding 15 parts of trisodium hydrogen phosphate. After completion of the reaction, the dye is isolated, at pH 7, by spray-drying. An orange powder is obtained, which dyes cotton and staple rayon, by conventional cold dyeing methods, in strong, fast orange hues.

EXAMPLE 6

53.6 parts of 1,4-phenylenediamine-2,5-disulfonic acid are dissolved in 900 parts of water at pH 7, 120 parts of hydrochloric acid (d=1.09) are added and diazotization is carried out with 13.8 parts of sodium nitrite, whilst cooling the mixture with ice. A solution of 61.5 parts of 1-(2-chloro-6-methylphenyl)-3-carboxy-5-pyrazolone in aqueous acetic acid is then added and the coupling is completed at a weakly acid pH. 37 parts of cyanuric chloride are then added to the dye solution, which is at 0°–5° C., and the acylation is completed at pH 6. After clarifying the mixture by filtration, the dye is precipitated by adding potassium chloride and filtered off. The material from the filter press is thoroughly mixed with 10 parts of disodium phosphate and 10 parts of monosodium phosphate and dried under reduced pressure. A yellow powder is obtained, which dyes cotton in fast, yellow hues.

Dyes having similar properties are obtained if instead of 1-(2-chloro-6-methylphenyl)-3-carboxy-5-pyrazolone, 1-(2-methylphenyl)-, 1-(2-chlorophenyl)-, 1-(2-methoxyphenyl)-, 1-(2,5-dichlorophenyl)-, 1-(2,5-dimethylphenyl)-, 1-(2-methyl-4-chlorophenyl)-, 1-(2,6-dichlorophenyl)-, 1-(2,4-dichloro-6-methoxyphenyl)-, or 1-(2,4,5-trichlorophenyl)-3-carboxy-5-pyrazolone is employed as the coupling component. If the syntheses are carried out with 1,3-phenylenediamine-4,6-disulfonic acid instead of 1,4-phenylenediamine-2,5-disulfonic acid, reactive dyes which give greenish yellow hues on cellulose are obtained.

EXAMPLE 7

23 parts of 1-acetylamino-3-aminobenzene-4-sulfonic acid are diazotized in the conventional way and the diazo compound is coupled with 27.3 parts of 1-(2-methylphenyl)-3-carboxy-5-pyrazolone in a weakly acid medium. Sufficient sodium hydroxide to give a 4% strength solution is then added, and the solution is heated at 85° C. until splitting off of the acetyl group is complete. After the solution has cooled, the aminoazo dye is precipitated by adding hydrochloric acid. The material from the filter press is dissolved in 800 parts of water, the solution is cooled to 0° C., and diazotization is carried out by adding 6.9 parts of sodium nitrite and 80 parts of hydrochloric acid (d=1.09). A neutralized solution of 22.3 parts of 1-naphthylamine-6-sulfonic acid is then added, the coupling is completed by adding anhydrous sodium carbonate, and the aminodisazo dye is acylated with 18.4 parts of cyanuric chloride at 10° C. 14.2 parts of disodium hydrogen phosphate are dissolved in the clarified dye solution, and the dye is precipitated under neutral conditions by adding salt. After drying the material from the filter press, 123 parts of a brown powder are obtained; this dyes cellulose in reddish yellow hues.

If instead of 1-acetylamino-3-aminobenzene-4-sulfonic acid, 1-acetylamino-4-aminobenzene-3-sulfonic acid is employed and the synthesis is completed as described above, a dye is obtained which dyes natural or regenerated cotton, and leather, in yellowish brown hues.

If, in Examples 1 to 7, a halogen atom in the triazine ring is replaced by, for example, the radical of an alcohol, mercaptan, phenol or thiophenol or, in particular, a radical of an aliphatic or aromatic amine or the $NH_2$ radical, as indicated in the tabulated Examples which follow, dyes of the same hue, which essentially only differ in respect of their reactivity, are obtained.

If, for example, the trichloropyrimidine, trifluoropyrimidine, 2-methylsulfonyl-4-methyl-5-chloropyrimidine, 2,4-difluoro-5-chloropyrimidine, 2,4-dichloropyrimidine-5-carbonyl, 3,6-dichloropyridazine-6-carbonyl, 3,4,6-trichloropridazinyl, 3,4,6-trifluoropyridazinyl, 2,3-dichloroquinoxaline-6-carbonyl, 1,4-dichloroquinoxaline-6-carbonyl, 2-chlorobenzthiazole-6-carbonyl, β-chloropropionyl, acrylyl or α-bromoacrylyl radical is introduced, in place of the dichlorotriazinyl radical, into the dyes described in Examples 1 to 7, dyes having similar properties are obtained.

Further dyes according to the invention, of the formula Ic

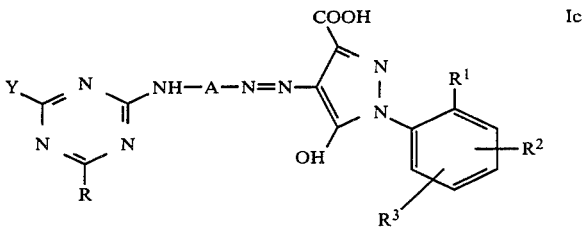

and their hues on cellulosic material are shown in the Table which follows.

| Example | Y | R | A | R¹ | R² | R³ | Hue |
|---|---|---|---|---|---|---|---|
| 8 | Cl | H₂N— | ![benzene-SO3H] | CH₃ | H | H | yellow |
| 9 | F | CH₃O— | " | " | " | " | " |
| 10 | Cl | NH₂— | " | " | 6-Cl | " | " |
| 11 | F | ![phenyl-NH- with SO3H] | " | Cl | H | " | " |

-continued
| Example | Y | R | A | R¹ | R² | R³ | Hue |
|---|---|---|---|---|---|---|---|
| 12 | Cl | NH₂— | " | F | " | " | " |
| 13 | " | " | " | CF₃ | H | " | " |
| 14 | 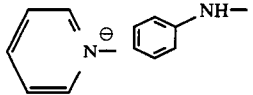 | 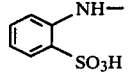 | " | CH₃ | " | " | " |
| 15 | Cl | H₂N— | " | Cl | H | H | " |
| 16 | F | " | " | " | " | " | " |
| 17 | Cl | " | " | " | 5-Cl | " | " |
| 18 | " | 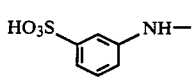 | " | " | 4-Cl | " | " |
| 19 | " | " | " | NO₂ | 4-CH₃ | " | " |
| 20 | " | " | " | " | 6-OCH₃ | " | " |
| 21 | " | 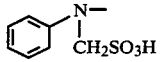 | " | COCH₃ | H | " | " |
| 22 | " | " | " | Cl | 4-Cl | 6-COOH | " |
| 23 | " | 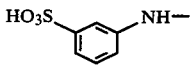 | " | OCH₃ | H | H | " |
| 24 | " | 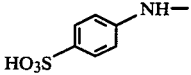 | " | Cl | 5-Cl | " | " |
| 25 | F | " | " | " | " | " | " |
| 26 | Cl | " | " | CH | 4-Cl | " | " |
| 27 | Br | " | " | Cl | 4-Cl | 6-Cl | " |
| 28 | Cl | " | " | CH₃ | 5-CH₃ | " | " |
| 29 | Cl | 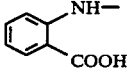 | " | O—C₂H₅ | H | H | " |
| 30 | " | " | " | OCH₃ | 5-OCH₃ | " | " |
| 31 | " | 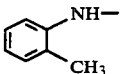 | " | Cl | 6-COOH | 4-Cl | " |
| 32 | " | 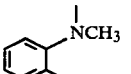 | " | Cl | H | H | " |
| 33 | " | 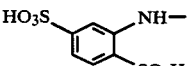 | " | CH₃ | " | " | " |
| 34 | " |  | " | CO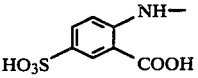 | " | " | " |
| 35 | " |  | " | SO₂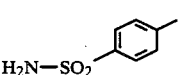 | " | " | " |
| 36 | " | 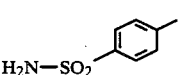 | " | OC₂H₅ | " | " | " |

| Example | Y | R | A | R¹ | R² | R³ | Hue |
|---|---|---|---|---|---|---|---|
| 37 | " | 7-Hal-naphthalene-1,3-disulfonic acid (SO₃H, HO₃S, Hal) | " | phenoxy (O-C₆H₅) | " | " | " |
| 38 | Cl | 4-(NH—)-naphthalene-1-sulfonic acid | " | Cl | 5-Cl | H | " |
| 39 | " | 8-(NH—)-naphthalene-6-sulfonic acid (HO₃S) | " | CH₃ | 6-Cl | " | " |
| 40 | " | 2-amino-4-(NH—)-1-sulfo-benzene (H₂N, HO₃S) | " | " | 4-Cl | " | " |
| 41 | " | $C_2H_5-NH-$ | " | Cl | " | " | " |
| 42 | " | $HO-C_2H_4-NH-$ | " | " | 5-Cl | " | " |
| 43 | F | $HOOC-CH_2-NH-$ | " | " | " | " | " |
| 44 | Cl | $(HOC_2H_4)_2N-$ | " | $OCH_3$ | 5-Cl | " | " |
| 45 | " | thiomorpholine-1,1-dioxide-N— ($O_2S$ ring with N—) | " | $C_2H_5$ | H | " | " |
| 46 | " | $HO_3S-C_2H_4-NH-$ | " | $CH_3$ | " | " | " |
| 47 | " | $HO_3S$-phenyl-NH—NH— | " | $CH_3$ | " | " | " |
| 48 | " | phenoxy (C₆H₅—O—) | " | Cl | " | " | " |
| 49 | " | phenylthio (C₆H₅—S—) | " | " | " | " | " |
| 50 | Cl | 4-tert-butyl-phenoxy ((CH₃)₃C—C₆H₄—O—) | " | Cl | H | H | " |
| 51 | " | 4-nonyl-phenoxy (C₉H₁₉—C₆H₄—O—) | " | Cl | " | " | " |
| 52 | " | $CH_3O-$ | " | $CH_3$ | " | " | " |
| 53 | " | $C_2H_5O-C_2H_4O-$ | " | $OCH_3$ | " | " | " |
| 54 | " | $(CH_3)_2CH-O-$ | " | $CF_3$ | " | " | " |
| 55 | " | $HO-$ | " | $CH_3$ | " | " | " |
| 56 | " | $H_2N-$ | 2,5-dimethyl-benzenesulfonic acid (SO₃H) | $CH_3$ | " | " | golden yellow |
| 57 | " | " | " | " | 4-Cl | " | " |
| 58 | " | 3-($HO_3S$)-phenyl-NH— | " | $NO_2$ | " | " | " |
| 59 | " | " | " | Cl | 5-Cl | " | " |
| 60 | " | " | " | $CH_3$ | 5-$CH_3$ | " | " |

-continued

| Example | Y | R | A | R¹ | R² | R³ | Hue |
|---|---|---|---|---|---|---|---|
| 61 | " | H₂O₅P–C₆H₄(3)–NH– | " | –OCH₃ | 4-OCH₃ | " | " |
| 62 | " | 2,4-(HO₃S)₂–C₆H₃–NH– | " | CF₃ | 4-Cl | H | " |
| 63 | " | " | " | OCH₃ | 4-OCH₃ | 5-Cl | " |
| 64 | Br | " | " | CH₃ | 3-Cl | H | " |
| 65 | Cl | 4-CH₃-C₆H₄–NH– | 4,6-(HO₃S)₂-2,5-dimethylphenyl | Cl | 5-Cl | H | yellow |
| 66 | F | 4-Cl-2-SO₃H-C₆H₃–NH– | " | " | " | " | " |
| 67 | Cl | CH₃O– | " | –O–C₆H₅ | H | " | " |
| 68 | " | H₂N– | " | C₂H₅ | 6-C₂H₅ | " | " |
| 69 | " | 1,4-(HO₃S)₂-naphth-3-yl-NH– | " | –O–C₆H₄–Cl | H | " | " |
| 70 | " | " | " | CH₃ | 5-CONH₂ | " | " |
| 71 | Cl | H₂N– | 2,5-dimethyl-1,4-(HO₃S)₂-phenyl | CF₃ | H | H | reddish yellow |
| 72 | " | " | " | COCH₃ | " | " | " |
| 73 | " | 4-HO₃S-C₆H₄–NH– | " | CH₃ | 4-Cl | " | " |
| 74 | " | 4-HOOC-C₆H₄–NH– | " | Cl | 4-Cl | 6-Cl | " |
| 75 | " | 3-CH₃CONH-C₆H₄–NH– | " | " | H | H | " |
| 76 | " | CH₃O– | " | " | " | " | " |
| 77 | " | naphth-1-yl-NH– | " | CH₃ | " | " | " |
| 78 | " | H₂N– | 3,5-dimethyl-4-SO₃H-phenyl | Cl | 5-Cl | " | yellow |
| 79 | " | 3-HOOC-C₆H₄–NH– | " | CH₃O | H | " | " |

-continued

| Example | Y | R | A | R¹ | R² | R³ | Hue |
|---|---|---|---|---|---|---|---|
| 80 | Cl | HO₃S—⟨benzene⟩(NH—)(COOH) | " | Cl | 3-Cl | H | " |
| 81 | " | " | CH₃—⟨benzene⟩(CH₃)(SO₃H) | " | H | " | " |
| 82 | " | H₂N— | ⟨benzene⟩(CH₃)(CH₃)(COOH) | " | " | " | " |
| 83 | F | H₂O₃P—⟨benzene⟩—NH— | " | " | 6-Cl | " | " |
| 84 | Cl | " | ⟨benzene⟩(CH₃)(CH₃)(Cl)(SO₃H) | " | H | " | " |
| 85 | " | HO₃S—⟨benzene⟩—NH— | " | CH₃ | 4-Cl | " | " |
| 86 | " | C₂H₅NH— | ⟨naphthalene⟩(SO₃H)(CH₃)(CH₃)(SO₃H) | Cl | 5-Cl | " | reddish yellow |
| 87 | F | C₂H₅O—C₂H₄—O— | " | " | H | " | " |

Further dyes according to the invention, of the formula Id

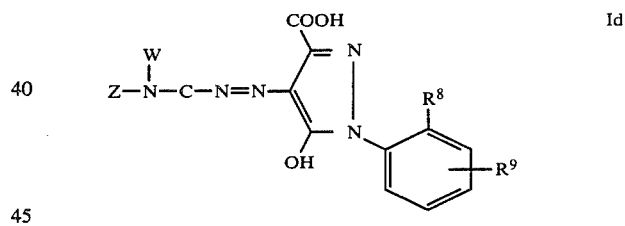

and their hues on cellulosic material are shown in the Table below:

| Example | Z | W | C | R⁸ | R⁹ | Hue |
|---|---|---|---|---|---|---|
| 88 | HO₃S—⟨benzene⟩(NH—)(HO₃S) —⟨triazine with Cl⟩ | H | ⟨biphenyl with SO₃H⟩ | CH₃ | H | orange |
| 89 | ⟨benzene⟩(N(CH₃)—)(HOOC) —⟨triazine with F⟩ | " | " | Cl | 5-Cl | " |

-continued

| Example | Z | W | C | R⁸ | R⁹ | Hue |
|---|---|---|---|---|---|---|
| 90 | [N-methyl-N-(2-carboxyphenyl)-amino triazine with F and N substituents] | " | [biphenyl-2,2'-disulfonic acid] | " | 6-Cl | golden yellow |
| 91 | [NH-linked triazine with CHCl, on 4-sulfo-2-carboxyphenyl] | " | [3,3'-dichlorobiphenyl] | OCH₃ | H | orange |
| 92 | [N-methyl-N-(4-sulfophenyl)amino-chloro-methyl-triazine] | " | [4-(benzoylamino)-benzene-sulfonic acid derivative] | Cl | " | golden yellow |
| 93 | [2-fluoro-6-fluoro-5-chloro-4-methylpyrimidine] | " | [benzoylamino-benzene-2,5-disulfonic acid] | CF₃ | " | reddish yellow |
| 94 | Cl—CH₂—CH₂—CO— | " | " | C₂H₅ | " | reddish yellow |
| 95 | [CH₃SO₂-pyrimidine with Cl and CH₃] | " | " | OC₂H₅ | " | reddish yellow |
| 96 | [2,3-dichloroquinoxaline-6-carbonyl] | " | " | Cl | " | reddish yellow |
| 97 | [2-fluoro-6-fluoro-5-chloro-4-methylpyrimidine] | " | [benzoylamino-benzene-2,5-disulfonic acid with methyl] | —COCH₃ | " | yellow |
| 98 | CH₂=C(Br)—CO— | " | " | CN | " | " |
| 99 | [2-chloro-3-chloropyrimidine-5-carbonyl] | " | " | CH₃ | " | " |
| 100 | [2-(4,6-disubstituted-triazinylamino)-5-sulfobenzoic acid with Cl] | " | [azo-linked bis-aryl: 2-methoxy-4-methyl-phenyl—N=N—3-methyl-4-sulfophenyl] | Cl | " | golden yellow |

-continued

| Example | Z | W | C | R⁸ | R⁹ | Hue |
|---|---|---|---|---|---|---|
| 101 | 2,5-difluoro-4-chloro-6-methylpyrimidin-yl (F, Cl, F, CH₃ substituents) | " | 4-methyl-2-(acetylamino)phenyl–N=N–(2,5-disulfo)phenyl (CH₃, CH₃–CO–NH, SO₃H, SO₃H) | " | " | yellowish brown |
| 102 | 4-(2-methyl-4-sulfophenylamino)-6-fluoro-s-triazin-2-yl (CH₃, HO₃S) | CH₃ | 4-methylphenyl–N=N–(3-methyl-4-sulfo)phenyl | " | 4-CH₃ | yellow |
| 103 | 4-methoxy-6-chloro-s-triazin-2-yl (CH₃O, Cl) | H | 4-methyl-2-(ureido)phenyl–N=N–(2,5-disulfo)phenyl (H₂N–CO–NH, SO₃H, SO₃H) | CH₃ | 5-CH₃ | yellowish brown |
| 104 | 4-(2,5-dicarboxyphenylamino)-6-chloro-s-triazin-2-yl (COOH, COOH, Cl) | " | 6-sulfonaphth-1-yl–N=N–(3-methyl-4-sulfo)phenyl (SO₃H) | C₂H₅ | H | reddish yellow |
| 105 | 4-methoxy-6-fluoro-s-triazin-2-yl (CH₃O, F) | " | " | " | " | reddish yellow |
| 106 | 2,5-dichloro-4-chloro-6-methylpyrimidin-yl (Cl, Cl, Cl, CH₃) | " | 6-phosphonaphth-1-yl–N=N–(3-methyl-4-sulfo)phenyl (PO₃H₂, SO₃H) | Cl | " | reddish yellow |
| 107 | 4-(2,5-disulfophenylamino)-6-chloro-s-triazin-2-yl (SO₃H, SO₃H, Cl) | " | phenyl–NH–SO₂–phenyl | " | " | yellow |
| 108 | 4-(3-phosphonophenylamino)-6-chloro-s-triazin-2-yl (PO₃H₂, Cl) | " | stilbene-2,2′-disulfo (–CH=CH–, SO₃H, SO₃H) | " | " | orange |

| Example | Z | W | C | R⁸ | R⁹ | Hue |
|---|---|---|---|---|---|---|
| 109 | (CH₃)₂CH—O—C(=N)—N=C(CH₃)—N=C(Cl) (triazine with isopropoxy and Cl) | " | " | " | " | " |
| 110 | F—C(=N)—N=C(F)—C(Cl)=C(CH₃) (fluoropyrimidine with Cl) | " | 2-methyl-5-(CH₂—)-naphthalene-1-SO₃H | " | " | reddish yellow |
| 111 | " | " | " | OCH₃ | " | reddish yellow |
| 112 | " | CH₃ | 2-methyl-4-(CH₂—)-benzenesulfonic acid (SO₃H) | Cl | " | yellow |

EXAMPLE 113

34.6 parts of 2 amino-4-β-hydroxyethylsulfonylanisole sulfuric acid ester (90% pure), in 160 parts of water and 90 parts of ice, are diazotized with 60 parts of hydrochloric acid (d=1.09) and 6.9 parts of sodium nitrite. Excess nitrous acid is then destroyed with 0.5 part of amidosulfonic acid and a neutralized aqueous solution of 23.2 parts of 1-(2,5-dimethylphenyl)-3-carboxy-5-pyrazolone is added to the diazo compound. For the coupling reaction, the pH is kept slightly acid, and after completion of coupling the dye is isolated by salting out. The material from the filter press is dried under reduced pressure at 35° C. 68 parts of a powder which dyes cellulose in fast yellow hues when applied by conventional methods are obtained.

If 1-(2-methylphenyl)-, 1-(2-chloro-4-methylphenyl)-, 1-(2-chlorophenyl)-, 1-(2,6-dichlorophenyl)-, 1-(2-phenoxyphenyl)-, 1-(2-acetylphenyl)- or 1-(2-ethoxyphenyl)-3-carboxy-5-pyrazolone is used instead of 1-(2,5-dimethylphenyl)-3-carboxy-5-pyrazolone, dyes having similar properties are obtained.

Further dyes according to the invention, of the formula Ic

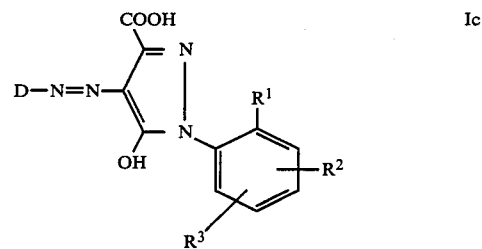

and their hues on cellulosic material are shown in the Table below.

| Example | D | R¹ | R² | R³ | Hue |
|---|---|---|---|---|---|
| 114 | HO₃SO—CH₂CH₂—SO₂—C₆H₄— | Cl | 6-COOH | 4-Cl | yellow |
| 115 | (C₂H₅)₂N—CH₂CH₂—SO₂—C₆H₄— | OCH₃ | H | H | " |
| 116 | H₂O₃PO—CH₂CH₂—SO₂—C₆H₄— | CN | " | " | " |
| 117 | " | Cl | " | " | " |
| 118 | Cl—CH₂CH₂—SO₂—C₆H₄— | CH₃ | " | " | " |
| 119 | HO₃S—O—CH₂CH₂—O—C₆H₄— | C₂H₅ | 5-C₂H₅ | " | reddish yellow |

-continued

| No. | Structure | | | | Color |
|---|---|---|---|---|---|
| 120 | CH₃—⌬—, HO₃S—OCH₂—CH₂—SO₂ (on ring) | Br | H | " | yellow |
| 121 | C₂H₅—SO₂—[benzothiazole with CH₃] | Cl | " | " | reddish yellow |
| 122 | C₂H₅—SO₂—[benzothiazole with CH₃, SO₃H] | F | " | " | " |
| 123 | CH₃O—⌬—, HO₃S—O—CH₂—CH₂—SO₂ | CCCH₃ | " | " | " |
| 124 | ⌬—PO₃H₂ | Cl | " | " | yellow |
| 125 | " | " | 5-Cl | " | " |
| 126 | " | CH₃ | 6-Cl | " | " |
| 127 | ⌬—P(=O)(OH)(P) | Cl | H | " | " |
| 128 | " | CF₃ | " | " | " |
| 129 | H₂O₃P—CH₂—⌬— | OC₂H₅ | " | " | " |
| 130 | ⌬ with CH₂—PO₃H₂ (×2) and CH₃ | Cl | 4-Cl | 6-Cl | reddish yellow |
| 131 | " | SO₂—⌬ | H | H | " |
| 132 | HO₃S—OCH₂CH₂—SO₂—⌬— | CF₃ | " | " | yellow |
| 133 | HO₃S—O—CH₂CH₂—SO₂—⌬(OCH₃)(CH₃) | Cl | " | " | golden yellow |
| 134 | " | CH₃ | 3-Cl | " | " |
| 135 | HO₃S—S—CH₂CH₂SO₂—⌬(OCH₃)(OCH₃) | " | 5-Cl | " | " |

-continued

| | | | | | | |
|---|---|---|---|---|---|---|
| 136 | (C₂H₅)₂N—CH₂CH₂—SO₂—[2,5-(OCH₃)₂-phenyl] | Cl | H | " | " | |
| 137 | HO₃S—O—CH₂CH₂—SO₂—[4-CH₃, 2-SO₃H-phenyl] | CH₃ | 3-CH₃ | " | yellow | |
| 138 | " | Cl | 4-Cl | " | " | |
| 139 | [6-PO₃H₂-naphthyl]—N=N—[phenyl-CH₂PO₃H₂] | " | H | " | yellowish brown | |
| 140 | [naphthyl(SO₂CH₂CH₂—O—SO₃H)] | " | " | " | reddish yellow | |
| 141 | [naphthyl(SO₂CH₂CH₂—O—SO₃H)(HO₃S)] | Cl | 5-CONH₂ | " | " | |
| 142 | [naphthyl(SO₂CH₂CH₂—O—SO₃H)(HO₃S—O—CH₂CH₂—SO₂)] | O—C₄H₉ | 5-O—C₄H₉ | " | " | |

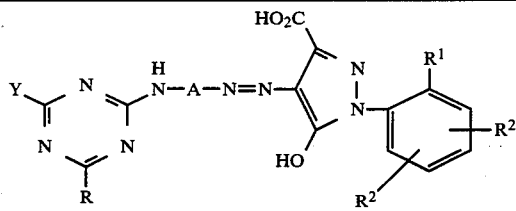

Ic

| Example | Y | R | A | R¹ | R² | R³ | Hue |
|---|---|---|---|---|---|---|---|
| 143 | Cl | Cl | [2,5-dimethyl-phenyl-SO₃H] | OCH₃ | 5 Cl | H | golden yellow |
| 144 | " | —NH₂ | " | " | " | " | " |
| 145 | " | —HN—[3-SO₃H-phenyl] | " | " | " | " | " |
| 146 | " | Cl | " | " | " | " | " |
| 147 | " | NH₂ | " | " | " | " | " |
| 148 | " | —HN—[3-SO₃H-phenyl] | " | " | " | " | " |
| 149 | " | —N(CH₃)—phenyl | " | " | " | " | " |

| | | | | | | | |
|---|---|---|---|---|---|---|---|
| 150 | " | HO₃S-⟨benzene-NH-, SO₃H⟩ (-NH- attached) | " | " | " | " | " |
| 151 | " | —NH₂ | " | Cl | 6 CH₃ | " | " |
| 152 | " | —NH-⟨benzene-SO₃H (meta)⟩ | " | " | " | " | " |
| 153 | " | H₃C-N(CH₃)-⟨phenyl⟩ | " | " | " | " | " |
| 154 | " | HO₃S-⟨benzene-HN-, SO₃H⟩ | " | " | " | " | " |
| 155 | " | —NH₂ | " | " | 5 Cl | " | " |
| 156 | " | CH₃-N(CH₃)-⟨phenyl⟩ | " | " | " | " | " |
| 157 | " | HO₃S-⟨benzene-HN-, SO₃H⟩ | " | CH₃ | H | " | " |
| 158 | " | —HN-⟨benzene-SO₃H⟩ | " | " | " | " | " |
| 159 | " | NH₂ | " | Cl | 6 Cl | " | " |
| 160 | " | —HN-⟨benzene-SO₃H⟩ | " | " | " | " | " |
| 161 | " | HO₃S-⟨benzene-HN-, SO₃H⟩ | " | " | " | " | " |
| 162 | " | —HN-⟨benzene-SO₃H⟩ | " | " | " | " | " |
| 163 | " | NH₂ | " | " | " | " | " |
| 164 | " | HO₃S-⟨benzene-HN-, SO₃H⟩ | " | CN | H | " | " |
| 165 | " | Cl | " | " | " | " | yellow |
| 166 | " | NH₂ | " | " | " | " | " |
| 167 | " | —HN-⟨benzene-SO₃H⟩ | " | " | " | " | " |
| 168 | " | HO₂C-⟨benzene-N(CH₃)-⟩ | " | Cl | 6 Cl | " | " |
| 169 | " | " | " | " | 6 CH₃ | " | " |
| 170 | " | " | " | CH₃ | " | " | " |
| 171 | " | HO₂C-⟨benzene-N(H)-⟩ | " | " | " | " | " |

-continued

| 172 | " | " | " | Cl | " | " | " |
| 173 | " | " | " | " | 6 Cl | " | " |

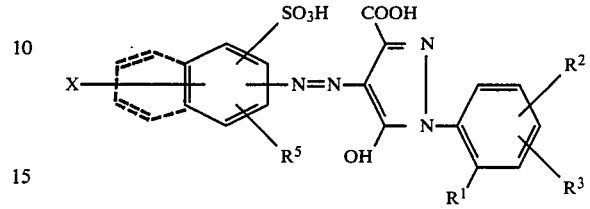

wherein
R[1] is fluorine, chlorine, bromine, methyl, ethyl, cyano, carboxyl, nitro, trifluoromethyl, acetyl, $C_1$-$C_4$ alkoxy, phenoxy, chlorophenoxy or benzoyl;

R[2] is hydrogen, chlorine, bromine, methyl, ethyl, $C_1$-$C_4$ alkoxy, benzthiazol-2-yl, 6-methylbenzthiazol-2-yl, acetylamino, carboxyl or aminocarbonyl;

R[3] is hydrogen, chlorine, bromine or methyl;

R[5] is hydrogen, methyl, methoxy or ethoxy; and

X is fluorohydroxyphosphonyl or dihydroxyphosphonyl.

3. The dye of claim 2, wherein, when R[3] is hydrogen, R[1] is fluorine, chlorine, bromine, methyl, ethyl, trifluoromethyl, methoxy or ethoxy and R[2] is hydrogen, chlorine, methyl, ethyl, methoxy or ethoxy; and R[5] and X are as defined in claim 13.

4. A dye of the formula:

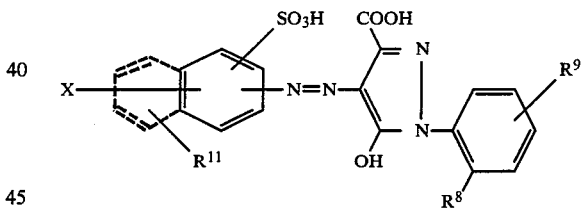

wherein
R[8] is fluorine, chlorine, bromine, methyl, ethyl, trifluoromethyl, methoxy or ethoxy;

R[9] is hydrogen, chlorine, methyl, ethyl, methoxy or ethoxy;

R[11] is hydrogen or methyl; and

X is fluorohydroxyphosphonyl or dihydroxyphosphonyl.

* * * * *

We claim:
1. A dye of the formula

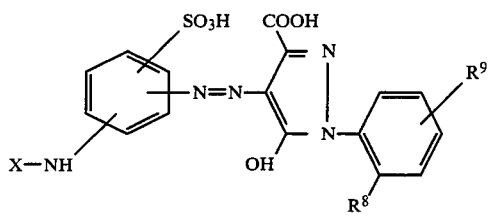

wherein
R[8] is fluorine, chlorine, bromine, methyl, ethyl, trifluoromethyl, methoxy or ethoxy;

R[9] is hydrogen, chlorine, methyl, ethyl, methoxy or ethoxy; and

X is a reactive radical capable under dyeing or printing conditions of forming a covalent bond with the substrate being dyed or printed selected from the group consisting of 2,4-dichloro-triazin-6-yl, 2,4-dichloropyrimidin-6-yl, 2,5,6-trichloro-pyrimidin-4-yl, 2,5,6-tri-fluoropyrimidin-4-yl, 2,6-difluoro-5-chloropyrimidin-4-yl, 2,4-dichloropyrimidine-5-carbonyl, 2,6dichloro-5-cyano-pyrimidin-4-yl, 3,4,6-trichloro- and tri-fluoropyridazin-5-yl, 2,3-dichloroquinoxaline-6-carbonyl, 2-chlorobenzthiazole-6-carbonyl, chloroacetyl, β-chloropropionyl, α,β-dichloro-propionyl, α,β-dibromopropionyl, acrylyl or α-bromoacrylyl.

2. A dye of the formula: